(12) United States Patent
Ogawa

(10) Patent No.: US 9,843,780 B2
(45) Date of Patent: Dec. 12, 2017

(54) LIGHT SOURCE UNIT INCLUDING LUMINESCENT WHEEL AND COLOR WHEEL, AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/063,231

(22) Filed: Mar. 7, 2016

(65) Prior Publication Data

US 2016/0360166 A1 Dec. 8, 2016

(30) Foreign Application Priority Data

Jun. 5, 2015 (JP) .................................. 2015-114730

(51) Int. Cl.
*G03B 21/20* (2006.01)
*H04N 9/31* (2006.01)
*G02B 26/00* (2006.01)
*G02B 5/02* (2006.01)

(52) U.S. Cl.
CPC ......... *H04N 9/3158* (2013.01); *G02B 5/0278* (2013.01); *G02B 26/008* (2013.01); *G03B 21/204* (2013.01); *H04N 9/3114* (2013.01); *H04N 9/3161* (2013.01)

(58) Field of Classification Search
CPC ........ G03B 21/14; G03B 21/20; G03B 21/00; H04N 9/31; H04N 5/74; G02B 26/00; G02B 5/02
See application file for complete search history.

(56) References Cited

U.S. PATENT DOCUMENTS

| 2012/0242912 | A1* | 9/2012 | Kitano | H04N 9/3111 348/759 |
| 2014/0118991 | A1* | 5/2014 | Lin | G02B 26/008 362/84 |
| 2014/0211169 | A1* | 7/2014 | Kitano | G03B 21/204 353/31 |

FOREIGN PATENT DOCUMENTS

JP 2010224493 A 10/2010

* cited by examiner

*Primary Examiner* — Sultan Chowdhury
*Assistant Examiner* — Danell L Owens
(74) *Attorney, Agent, or Firm* — Holtz, Holtz & Volek PC

(57) ABSTRACT

A projector includes alight source unit including a light source, a luminescent wheel having light source segments receiving light from the light source to emit different wavelength ranges of light, a color wheel separate from the luminescent wheel that has a first transmission area transmitting light, in visible light, existing in a certain range of wavelengths and a second transmission area transmitting light existing in a range of wavelengths broader than that of the light transmitted through the first transmission area and on to which the different wavelength ranges of light from the luminescent wheel are shone, and a control module controlling not only the luminescent wheel and the color wheel so that they are synchronized with each other but also the light source so that the light emitted from the light source is sequentially shone on to the light source segments.

10 Claims, 11 Drawing Sheets

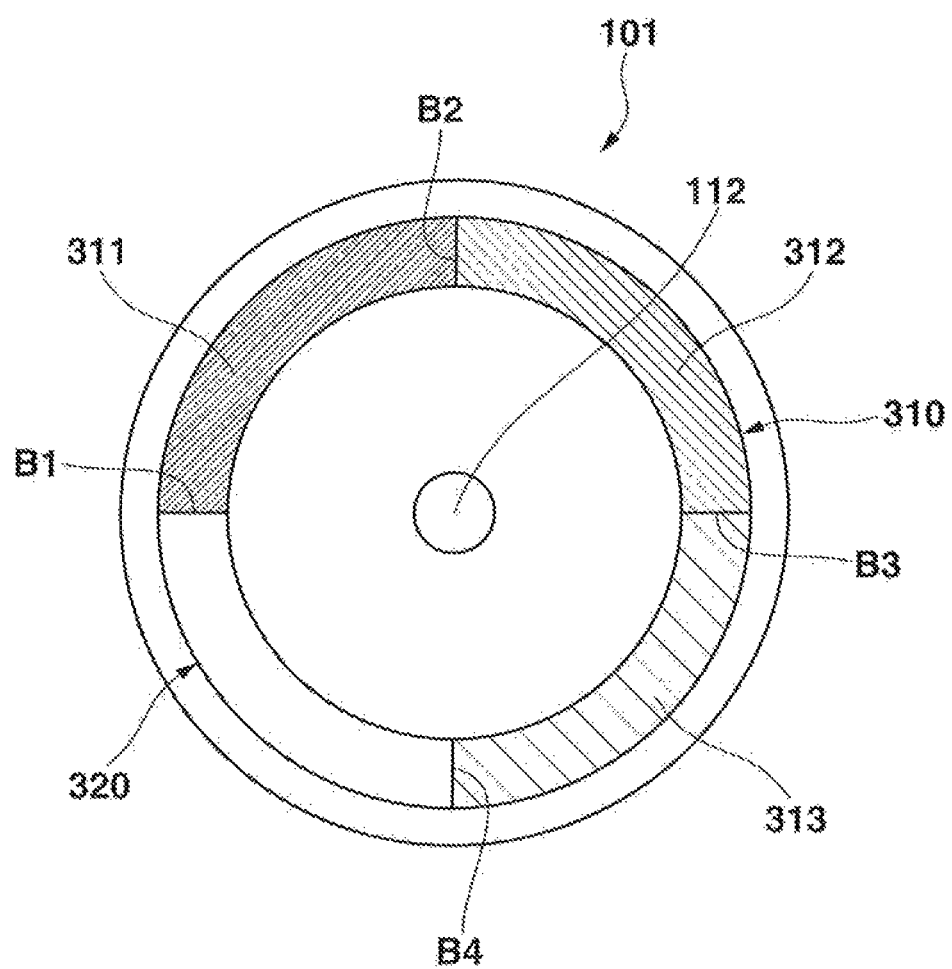

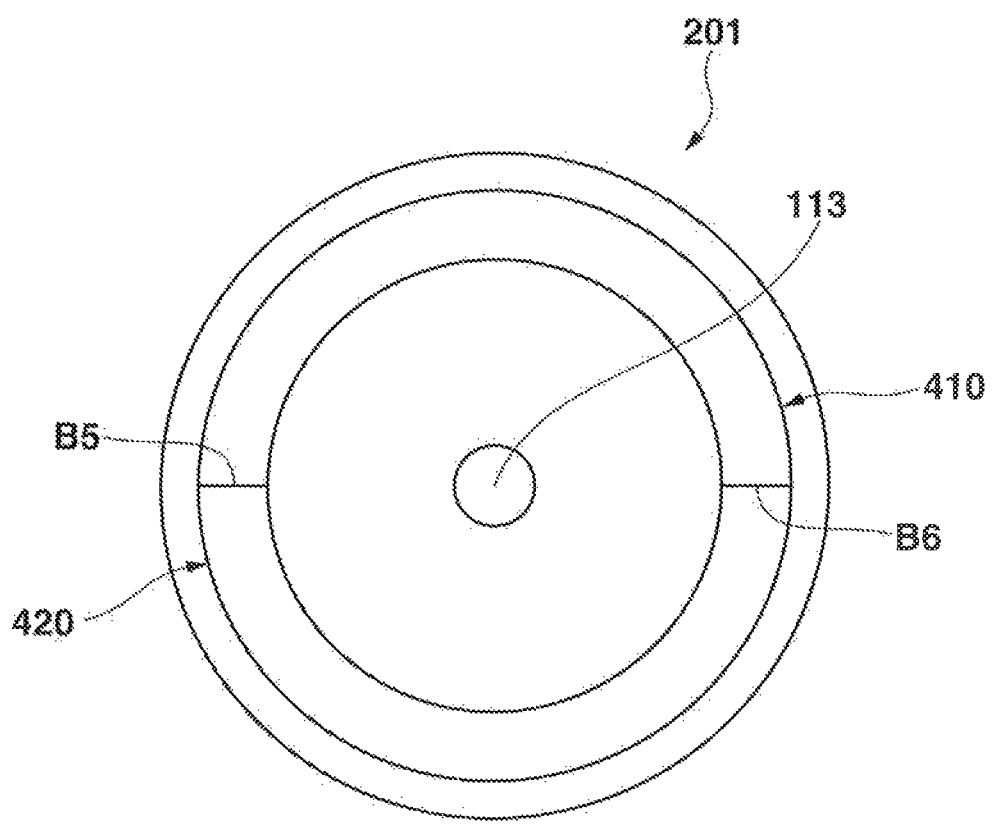

LIGHT SOURCE UNIT INCLUDING LUMINESCENT WHEEL AND COLOR WHEEL, AND PROJECTOR

CROSS-REFERENCE TO RELATED APPLICATION

This application is based upon and claims the benefit of priority under 35 USC 119 from Japanese Patent Application No. 2015-114730 filed on Jun. 5, 2015, the entire disclosure of which, including the description, claims, drawings and abstract, is incorporated herein by reference.

BACKGROUND OF THE INVENTION

Field of the Invention

The present invention relates to a light source unit and a projector including this light source unit.

Description of the Related Art

In these days, data projectors are used on many occasions as an image projection system which projects a screen and a video image of a personal computer, as well as images based on image data which is stored on a memory card on to a screen. In these projectors, light emitted from a light source is collected to a micromirror display device made up of DMDs (Digital Micromirror Devices) or a liquid crystal panel to thereby project a color image on to a screen.

Conventionally, the mainstream of these data projectors has been those which utilize a high-intensity discharge lamp as a light source. In recent years, however, there have been made many developments on projectors which use, as a light source, light emitting diodes (LED), laser diodes, organic electroluminescent elements, and luminous light emitting or luminescent materials.

For example, Japanese Unexamined Patent Publication No. 2010-224493 discloses a projector which includes a light source which emits spotlight, a polygonal plate-shaped scanning member which reflects the spotlight and a color wheel. The scanning member reflects spotlight from the light source at a specified angle. The color wheel has three luminescent color filters which emit three colors of luminous light. These color filters are disposed end to end circumferentially in a divided fashion on the color wheel which is a rotatable circular disk. The scanning member has a plurality of mirrors which are arranged on a side surface thereof so as to correspond to the luminescent color filters, so that the luminescent color filters on the color wheel are sequentially scanned by the spotlight reflected by the mirrors. Then, the three colors of luminous light excited in the luminescent color filters are emitted in a time-sharing fashion as a plurality of colors of light source light.

In the projector disclosed by Japanese Unexamined Patent Publication No. 2010-224493, however, the resulting red light, green light and blue light are the light obtained by exciting luminescent materials of colors which correspond to the color filters provided on the color wheel by the spotlight which is emitted from the single semiconductor laser light source and which has a wavelength in a range of ultraviolet wavelengths. The luminous light is emitted from an opposite side of the color wheel to the surface that the spotlight enters and then enters the integrator for use as the light source of the projector. However, light excited by a luminescent material is sometimes emitted in various directions, and therefore, the other luminous light than the luminous light that enters the integrator cannot be used as the light source light. In addition, as in Japanese Unexamined Patent Publication No. 2010-224493, in the event that a color to be obtained as light source light corresponds to a certain segment of the segments of color filters, this particular segment cannot be used to emit another color of light. Because of this, in the event that the number of colors to be used to form an image is changed depending on a projection mode, all the segments cannot be used, resulting in a reduction in luminance of a projected image.

SUMMARY OF THE INVENTION

The invention has been made in view of the situations described above, and an object of the invention is to provide a light source unit which can reduce a risk of reduction in luminance of a projected image and a projector which employs the light source unit.

According to a first aspect of the invention, there is provided a light source unit including:

a light source;

a luminescent wheel having a plurality of segments that receive light emitted from the light source to emit different wavelength ranges of light;

a color wheel separate from the luminescent wheel that has a first transmission area that transmits light, in visible light, that exists in a certain range of wavelengths and a second transmission area that transmits light that exists in a range of wavelengths that is broader than the range of wavelengths of the light that is transmitted through the first transmission area and on to which the different wavelength ranges of light from the luminescent wheel are shone; and a control module configured to control not only the luminescent wheel and the color wheel so that the luminescent wheel and the color wheel are synchronized with each other but also the light source so that the light emitted from the light source is sequentially shone on to the plurality of light source segments.

According to a second aspect of the invention, there is provided a projector including:

the light source unit according to the first aspect;

a display device configured to generate image light;

a projection-side optical system configured to project image light emitted from the display device onto a screen; and a projector control unit configured to control the light source unit and the display device.

BRIEF DESCRIPTION OF THE SEVERAL VIEWS OF THE DRAWINGS

FIG. 4 is a schematic plan view of an optical wheel according to the first embodiment of the invention.

FIG. 5 is a schematic plan view of a color wheel according to the first embodiment of the invention.

DETAILED DESCRIPTION OF THE PREFERRED EMBODIMENT

First Embodiment

Figure 1:
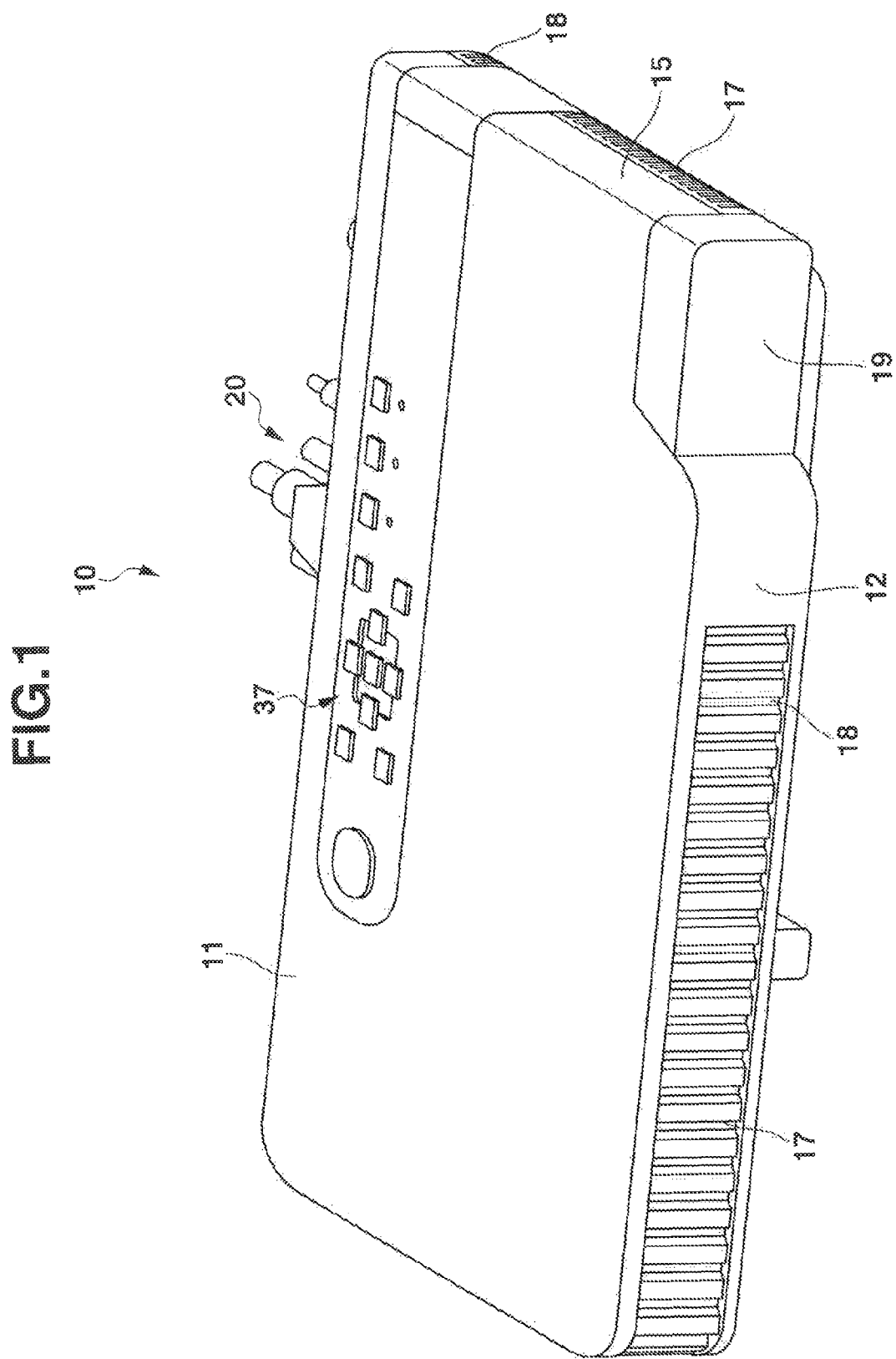
FIG. 1 is an external perspective view of a projector according to a first embodiment of the invention.

Hereinafter, a mode for carrying out the invention will be described. FIG. 1 is an external perspective view of a projector 10 which represents a projector according to a first embodiment of the invention. In this embodiment, when referred to in relation to the direction of the projector 10, left and right denote, respectively, left and right in relation to the projecting direction of the projector 10, and when referred to in relation to the direction of the projector 10, front and rear denote, respectively, front and rear in relation to the direction of a screen and a traveling direction of a pencil of light that is emitted from the projector 10 towards a screen.

As shown in FIG. 1, the projector 10 has a substantially rectangular parallelepiped housing. The projector 10 has a lens cover 19 that covers a projection port provided at a side of a front panel 12 that is a front side panel of the projector housing. Pluralities of outside air inlet slit holes 18 and inside air outlet slit holes 17 are provided in the front panel 12. Additionally, although not shown, the projector 10 includes an IR reception unit which receives a control signal from a remote controller.

In addition, a keys/indicators unit 37 is provided on an upper panel 11 of the projector housing. Disposed on this keys/indicators unit 37 are keys and indicators that include a power supply switch key, a power indicator, a projection switch key, and an overheat indicator. The power indicator informs whether the power supply is on or off. The projection switch key switches on or off the projection by the projector 10. The overheat indicator informs of an overheat condition occurring in a light source unit, a display device, or a control circuit when they really overheat.

Further, provided on a back panel 13 of the projector housing are an input/output connector unit where USB terminals, a video signal input D-SUB terminal, an S terminal, and an RCA terminal are provided and various types of terminals 20 including a power supply adaptor. Additionally, a plurality of outside air inlet slit holes are formed in the back panel of the projector casing. Pluralities of inside air outlet slit holes 17 are formed in each of a right side panel, not shown, that is a side panel of the casing and a left side panel 15 that is a side panel shown in FIG. 1. Further, a plurality outside air inlet slit holes 18 are also formed near a corner portion defined between the left side panel and the back panel 13.

Figure 2:
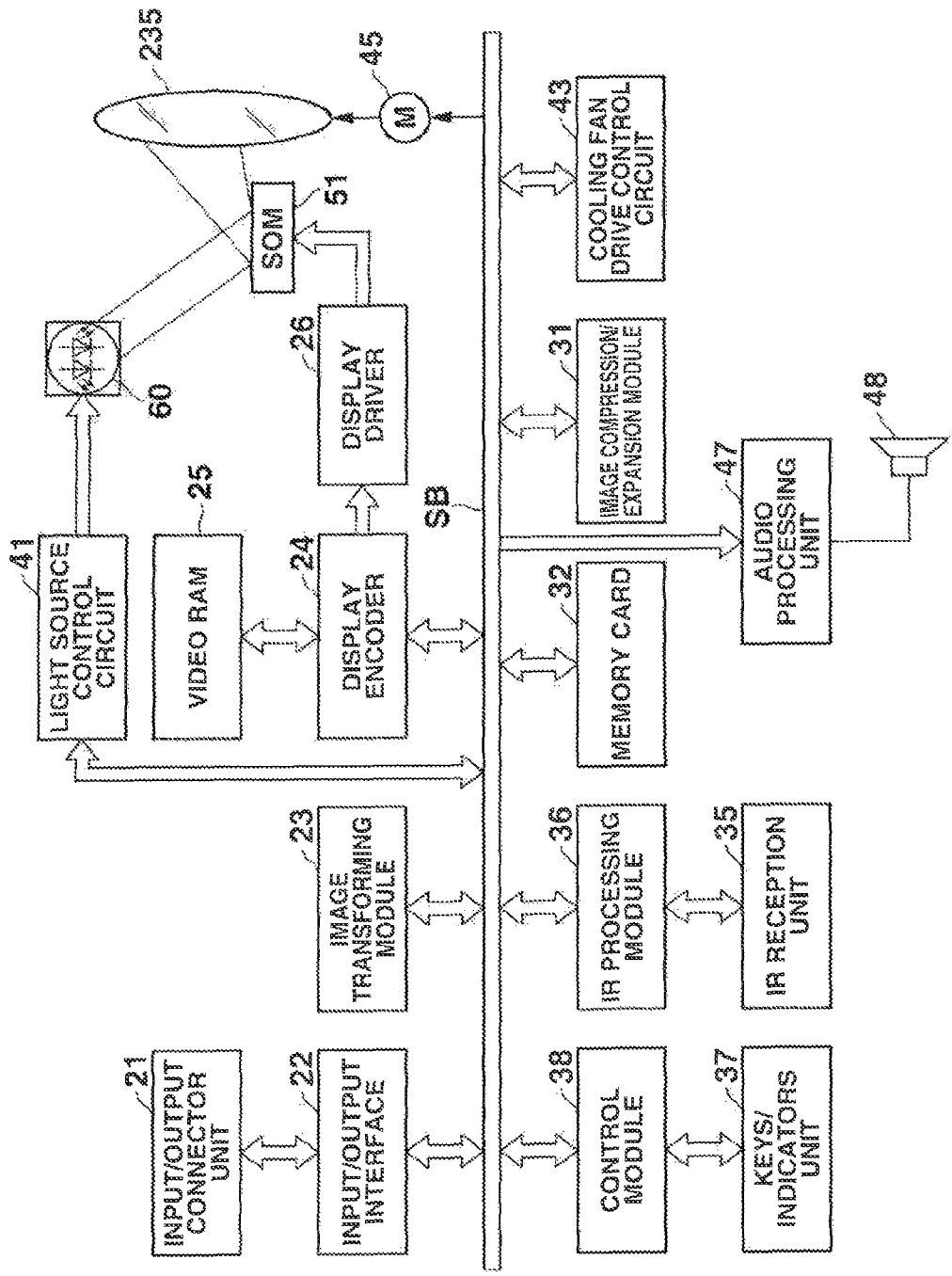
FIG. 2 is a diagram showing functional blocks of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24 and a display driver 26. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control device and drives a display device 51, which is a spatial optical modulator (SOM), at an appropriate frame rate according to the image signal outputted from the display encoder 24. In this projector 10, a pencil of light that is emitted from a light source unit 60 is shone onto the display device 51 via a light source-side optical system, whereby an optical image is formed by using reflected light that is reflected by the display device 51. The image so formed is then projected on to a screen, not shown, via a projection-side optical system. In addition, a movable lens group 235 of the projection-side optical system is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion module 31 performs the following operation. Specifically, the image compression/expansion module 31 reads out image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images based on the image data stored on the memory card 32.

The control module 38 controls respective operations of circuitries within the projector 10 and is made up of a CPU, a ROM which stores in a fixed fashion operation programs of various types of settings and a RAM which is used as a working memory.

Operation signals which are generated at the keys/indicators unit 37 which includes the main keys and indicators which are provided on the upper panel 11 of the housing of the projector 10 are sent out directly to the control module 38. Key operated signals from the remote controller are received by the IR reception unit 35, and a code signal demodulated at an IR processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 so as to output loudly sound or voice based on the audio data.

The control module 38 controls a light source control circuit 41 which is configured as a light source control unit. This light source control circuit 41 controls individually the operations of an excitation light shining device so that specified ranges of wavelengths of light that are required in producing an image are emitted from the light source unit 60. In addition, being instructed by the control module 38, the light source control circuit 41 controls a timing at which a luminescent wheel is synchronized with a color wheel according to a projection mode.

Further, the control module 38 causes a cooling fan drive control circuit 43 to detect temperatures through a plurality of temperature sensors which are provided in the light source unit 60 so as to control the rotating speed of cooling fans based on the results of the temperature detections. Additionally, the control module 38 also causes the cooling fan drive control circuit 43 to keep the cooling fan rotating even after the power supply to a projector main body is switched off by use of a timer. Alternatively, the control module 38 causes the cooling fan drive control circuit 43 to cut off the power supply to the projector main body of the projector 10 depending upon the results of the temperature detections by the temperature sensors.

Figure 3:
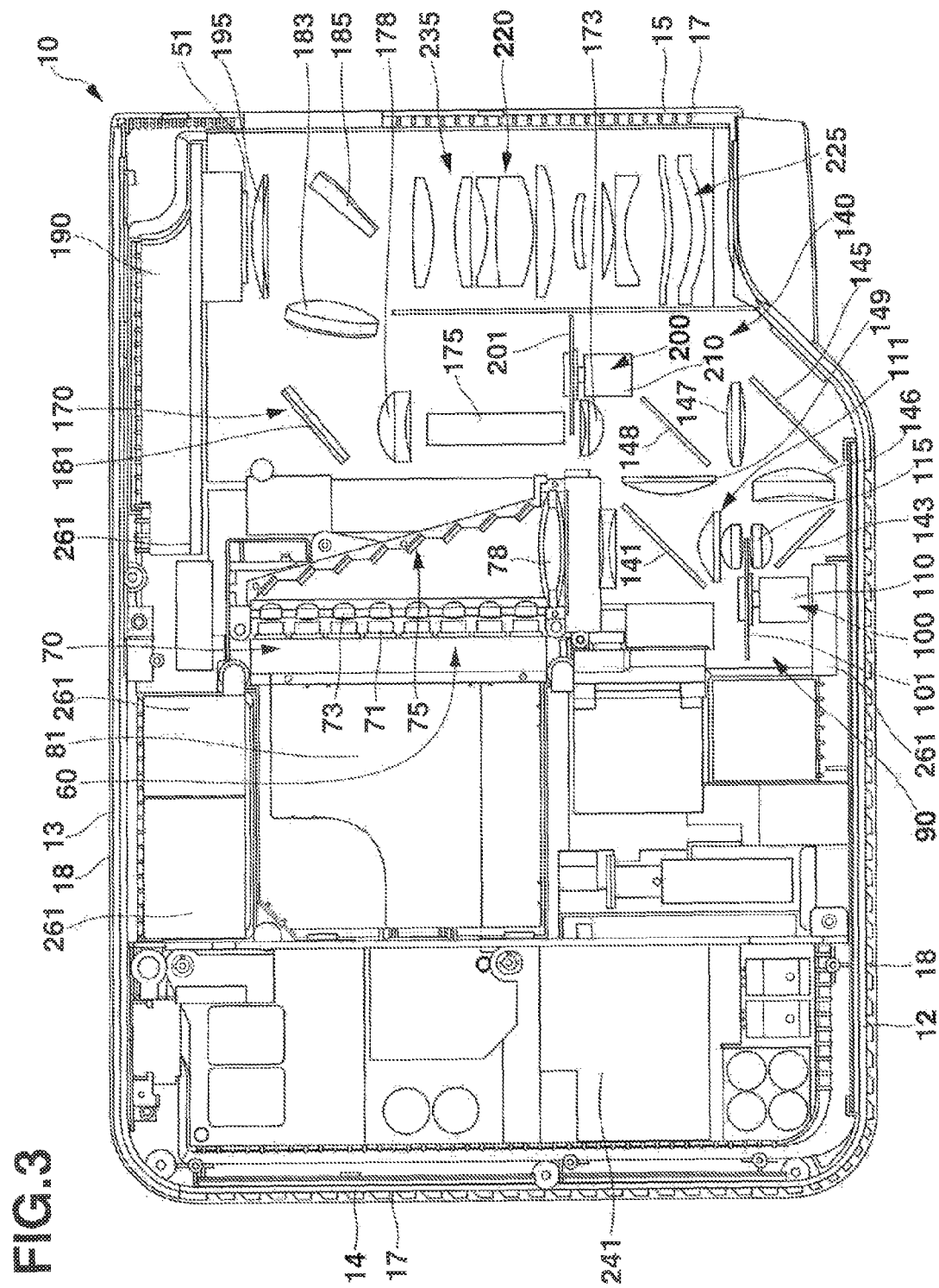
FIG. 3 is a schematic plan view showing an internal construction of the projector according to the first embodiment of the invention.

FIG. 3 is a schematic plan view showing an internal construction of the projector 10. The projector 10 includes a control circuit board 241 which is provided near the right side panel 14. This control circuit board 241 includes a power supply circuit block and a light source control block. The projector 10 includes the light source unit 60 which is provided at a side of the control circuit board 241, that is, at a substantially central portion of the housing of the projector 10. Further, the projector 10 includes a light source-side optical system 170 and a projection-side optical system 220 which are disposed between the light source unit 60 and the left side panel 15.

The light source unit 60 includes an excitation light shining device 70 and a luminous-light light source device 90. The excitation light shining device 70 functions an excitation light source as well as a light source of light in a range of blue wavelengths. The luminous-light light source device 90 constitutes a light source of light in a range of red wavelengths, light in a range of yellow wavelengths and light in a range of green wavelengths. The luminous light source device 90 is made up of the excitation light shining device 70, a luminescent wheel device 100 and a color wheel device 200. The light source unit 60 also includes a light guiding optical system 140 configured to guide and emit specified different ranges of wavelengths of light. The light guiding optical system 140 collects the specified different ranges of wavelengths of light to an incident port of a light tunnel 175.

The excitation light shining device 70 is disposed at a substantially central portion in relation to a left-to-right direction of the housing of the projector 10 which lies near the back panel 13. The excitation light shining device 70 includes a light source group made up of a plurality of blue laser diodes 71 that are semiconductor light emitting elements which are disposed so that their optical axes are parallel to the back panel 13, a reflecting mirror group that changes the direction of axes of light rays emitted from the blue laser diodes 71 through 90 degrees in the direction of the front panel 12, a collective lens 78 that collects the right rays emitted from the blue laser diodes 71 and reflected by the reflecting mirror group, and a heat sink 81 that is provided between the blue laser diodes 71 and the front side panel 12.

The light source group is made up of the plurality of blue laser diodes 71 which are disposed in a matrix configuration. A plurality of collimator lenses 73 are disposed individually on the optical axes of the blue laser diodes 71, and these collimator lenses 73 transform light emitted individually from the blue laser diodes 71 into parallel light so as enhance the directionality of the light so emitted. In the reflecting mirror group 75, a plurality of reflecting mirrors are disposed in a step-like fashion and are integrated with a mirror substrate. The reflecting mirrors are then adjusted in position so as to contract pencils of light emitted from the blue laser diodes 71 in one direction for emission to the collective lens 78.

A cooling fan 261 is disposed between the heat sink 81 and the back panel 31, and the blue laser diodes 71 are cooled by the cooling fan 261 and the heat sink 81. Further, a cooling fan 261 is also disposed between the reflecting mirror group 75 and the back panel 13, and the reflecting mirror group 75 and the collective lens 78 are cooled by this cooling fan 261.

The luminescent wheel device 100 that makes up the luminous-light light source device 90 is disposed on an optical path of excitation light emitted from the excitation light shining device 70 and near the front panel 12. The luminescent wheel device 100 includes a luminescent wheel 101, a motor 110, a collective lens group 111 and a collective lens 115. The luminescent wheel 101 is disposed parallel to the front panel 12, that is, so as to be at right angles to an axis of light emitted from the excitation light shining device 70. The motor 110 drives the luminescent wheel 101 rotationally. The collective lens group 111 collects a pencil of excitation light emanating from the excitation light shining device 70 towards the luminescent wheel 101 and also collects a pencil of light emanating from the luminescent wheel 101 in the direction of the back panel 13. The collective lens 115 collects a pencil of light emanating from the luminescent wheel 101 in the direction of the front panel 12. A cooling fan 261 is disposed on a side of the motor 110 that faces the front panel 12, and the luminescent wheel device 100 is cooled by this cooling fan 261.

The light guiding optical system 140 includes collective lenses that collect pencils of light in the ranges of red, yellow, green and blue wavelengths, reflecting mirrors that change the direction of axes of the pencils of light in the ranges of red, yellow, green and blue wavelengths so that the pencils of light are directed in the same direction, and dichroic mirrors. Specifically speaking, in the light guiding optical system 140, a first dichroic mirror 141 is disposed between the collective lens 78 and the collective lens group 111. This first dichroic mirror 141 transmits light in the range of blue wavelengths and reflects light in the range of red wavelengths, light in the range of yellow wavelengths and light in the range of green wavelengths so that the direction of axes of the red, yellow and green lights are changed through 90 degrees in the direction of the left side panel 15.

A first reflecting mirror 143 is disposed on an axis of light in the range of blue wavelengths that is transmitted or transmitted diffusibly through the luminescent wheel 101, that is, between the collective lens 115 and the front panel 12. This first reflecting mirror 143 reflects the light in the range of blue wavelengths so that the direction of the axis of the blue light is changed through 90 degrees in the direction of the left side panel 15. A collective lens 146 is disposed on a side of the first reflecting mirror 143 that lies to face the left side panel 15, and a second reflecting mirror 145 is disposed on a side of the collective lens 146 that lies to face the left side panel 15. A collective lens 147 is disposed on a side of the second collective mirror 145 that lies to face the back panel 13. The second reflecting mirror 145 changes the direction of the axis of the light in the range of blue wavelengths that is reflected by the first reflecting mirror 143 to enter the second reflecting mirror 145 through the collective lens 146 through 90 degrees in the direction of the back panel 13.

A collective lens 149 is disposed on a side of the first dichroic mirror 141 that lies to face the left side panel 15. A second dichroic mirror 148 is disposed on a side of the collective lens 149 that lies to face the left side panel 15 and on a side of the collective lens 147 that lies to face the back panel 13. The second dichroic mirror 148 reflects the light in the range of red wavelengths and the light in the range of yellow wavelengths and the light in the range of green wavelengths so that the direction of the axes of the red, yellow and green lights is changed through 90 degrees in the direction of the back panel 13 and transmits the light in the range of blue wavelengths.

The axes of the light in the range of red wavelengths, the light in the range of yellow wavelengths and the light in the range of green wavelengths that are reflected by the first dichroic mirror 141 are directed to the collective lens 149 so that the red, yellow and green lights enter the collective lens 149. Then, the light in the range of red wavelengths, the light in the range of yellow wavelengths and the light in the range of green wavelengths that pass through the collective lens 149 are reflected by the second dichroic mirror 148 and are then collected to the incident port of the light tunnel 175 via a collective lens of the light source-side optical system 170. On the other hand, the light in the range of blue wavelengths that passes through the collective lens 147 passes through the second dichroic mirror 148 and is then collected to the incident port of the light tunnel 175 via the collective lens 173.

The light source-side optical system 170 is made up of the collective lens 173, the light tunnel 175, a collective lens 178, a light axis changing mirror 181, a collective lens 183, a light shining mirror 185 and a condenser lens 195. The condenser lens 195 emits image light emanating from the display device 51 that is disposed on a side of the condenser lens 195 that lies to face the back panel 13 towards the projection-side optical system 220, and therefore, the condenser lens 195 is also regarded as part of the projection-side optical system 220.

The collective lens 173 is disposed near the light tunnel 175 to collect the light from the light source unit to the incident port of the light tunnel 175. The light in the ranges of red, yellow, green and blue wavelengths is collected by the collective lens 173 and then emanates therefrom towards the light tunnel 175.

The color wheel device 200 includes a color wheel 201 and a motor 210 that drives the color wheel 201 rotationally. The color wheel 201 is disposed between the collective lens 173 and the light tunnel 175 so as to be at right angles to an axis of a pencil of light emanating from the collective lens 173. The pencil of light that enters the color wheel 201 passes through either of segments provided on the color wheel 201 to emanate therefrom towards the light tunnel 175 while the specified components of the pencil of light, that is, the ranges of wavelengths of the specified colors are cut off. Thereafter, the pencil of light that enters the light tunnel 175 is formed into a pencil of light whose intensity is uniformly distributed.

The light axis changing mirror 181 is disposed on an optical axis of the light tunnel 175 on a side of the light tunnel 175 that lies to face the back panel 13 via the collective lens 178. A pencil of light emanating from an emanating port of the light tunnel 175 is collected by the collective lens 178, whereafter the direction of an axis of the pencil of light so collected is changed towards the left side panel 15 by the light axis changing mirror 181.

The pencil of light that is reflected by the light axis changing mirror 181 is collected by the collective lens 183 and is then shone on to the display device 51 at a specified angle via the condenser lens 195 by the light shining mirror 185. A heat sink 190 is provided on a side of the display device 51 which is made up of DMDs that lies to face the back panel 13, and the display device 51 is cooled by this heat sink 190.

The pencil of light, which is the light emanating from the light source unit 60, is shone on to an image forming plane of the display device 51 by the light source-side optical system 170 and is then reflected on the image forming plane of the display device 51 to be projected on to a screen via the projection-side optical system 220 as projected light. Here, the projection-side optical system 220 includes the condenser lens 195, the movable lens group 235, and a fixed lens group 225. The movable lens group 235 can be moved by the lens motor. Then, the movable lens group 235 and the fixed lens group 225 are incorporated in a fixed lens barrel. Thus, the fixed lens barrel incorporating the movable lens group 235 therein is made into a variable focus lens which enables zooming and focusing adjustments.

By configuring the projector 10 in the way described heretofore, when the luminescent wheel 101 and the color wheel 201 are rotated and light is emitted from the excitation light shining device 70 at appropriate timings, light in the ranges of red, yellow, green and blue wavelengths enters sequentially the collective lens 173 and the light tunnel 175 via the light guiding optical system 140 and enters further the display device 51 via the light source-side optical system 175. Then, the DMDs making up the display device 51 of the projector 10 display light of red, yellow, green and blue colors in a time-sharing fashion according to inputted data, thereby making it possible to project a color image on to the screen.

In this embodiment, while the excite shining device 70 is described as constituting the light source of light in the range of blue wavelengths, a separate light source may be provided as the light source of light in the range of blue wavelengths.

FIG. 4 is a schematic plan view of the luminescent wheel 101. The luminescent wheel 101 has a circular disc shape and has a mounting hole portion 112 in a center thereof. A shaft portion of the motor 110 is securely fitted in the mounting hole portion 112 to be fixed in place therein. This allows the luminescent wheel 101 to rotate about an axis together with the shaft portion of the motor 110 when it is driven to rotate.

The luminescent wheel 101 has a plurality of light source segments that emit light in different ranges of wavelengths when the luminescent wheel 101 receives light emitted from the excitation light shining device 70 which is configured as the light source. Namely, the luminescent wheel 101 has a luminous light emitting area 310 and a transmission area (a fourth light source segment) 320 that are arranged continuously end to end in a circumferential direction so as to form an annular shape.

A base material for the luminescent wheel 101 is a metallic material made of copper or aluminum, and a surface of this base material that lies to face the excitation light shining device 70 is mirror finished through silver deposition. The luminous light emitting area 310 is formed on the mirror finished surface. The luminous light emitting area 310 has a green luminescent material layer (a first light source segment) 311, a yellow luminescent material layer (a second light source segment) 312, and a red luminescent material layer (a third light source segment) 313. The luminescent material layers 311, 312, 313 are formed in the circumferential direction with boundaries B2, B3 defined therebetween. The green luminescent material layer 311, the yellow luminescent material layer 312 and the red luminescent material layer 313 receive light in the range of blue wavelength as excitation light to emit luminous light including light in a range of green wavelengths (light in a first range of wavelengths), light in a range of yellow wavelengths (light in a second range of wavelengths) and light in a range of red wavelengths (light in a third range of wavelengths) from the corresponding light source segments.

When light in a range of blue wavelengths, which is excitation light, is shone from the excitation light shining device 70 on to the luminescent material layers of the luminescent wheel 101, luminous materials in the luminous material layers emit therefrom luminous light in every direction. A pencil of luminous light is emitted towards the back panel 13 to enter the collective lens group 111. On the other hand, light in the range of blue wavelengths that enters the transmission area from the excitation light shining device 70 is transmitted or transmitted diffusibly therethrough to enter the collective lens 115 that is disposed on a back side (in other words, a side facing the front panel 12) of the luminescent wheel 101.

The transmission area 320 is formed between the red luminescent material layer 313 and the green luminescent material layer 311 with boundaries B1, B4 defined therebetween so as to be arranged continuously end to end to the luminous light transmission area 310 in the circumferential direction. In the transmission area 320, a transparent material having transparency is fitted in a light transmission portion cut out in the base material. This transparent material is formed of a transparent material like glass or resin. Additionally, the transparent material may include a diffusion layer that is provided on the surface on the side to which light in the range of blue wavelengths is shone. As this occurs, for example, a transparent material whose surface is processed to generate minute irregularities thereon through sandblasting is provided. In this way, in the luminescent wheel 101 that receives light in the range of blue wavelengths at the transmission area 320, after the light in the range of blue wavelengths (the light in the fourth range of wavelengths) is transmitted or transmitted diffusibly therethrough, the blue light is emitted from a rear surface side thereof.

FIG. 5 is a schematic view of the color wheel 201 when seen from a front of the color wheel 102. The color wheel 201 has a circular disc shape and has a mounting hole portion 113 in a center thereof. A shaft portion of the motor 210 is securely fitted in the mounting hole portion 113 so as to be fixed in place therein. The color wheel 201 can rotate about an axis together with the shaft portion of the motor 201 when the motor 201 is driven to rotate.

The color wheel 201 has a white light transmission area (a second transmission area) 410 that is formed so as to transmit white light (visible light) and a blue and green light transmission area (a first transmission area) 420 in a position where the light in the specified ranges of wavelengths collected by the collective lens 173 shown in FIG. 3 is shone. The white light transmission area 410*a* and the blue and green light transmission area 420 are arranged continuously end to end in a circumferential direction into an annular shape with boundaries B5, B6 defined therebetween. The white light transmission area 410 is an area that transmits at least light in the range of red wavelengths, light in the range of yellow wavelengths, light in the range of green wavelengths and light in the range of blue wavelengths. The blue and green light transmission area is an area that transmits light in the range of blue wavelengths and light in the range of green wavelengths and cuts off light in the ranges of other wavelengths. The blue and green light transmission area 420 may be configured so as to transmit light in the range of blue wavelengths and light in the range of green wavelengths, as well as light in ranges of other wavelengths than the wavelengths of visible light.

Figure 6A:
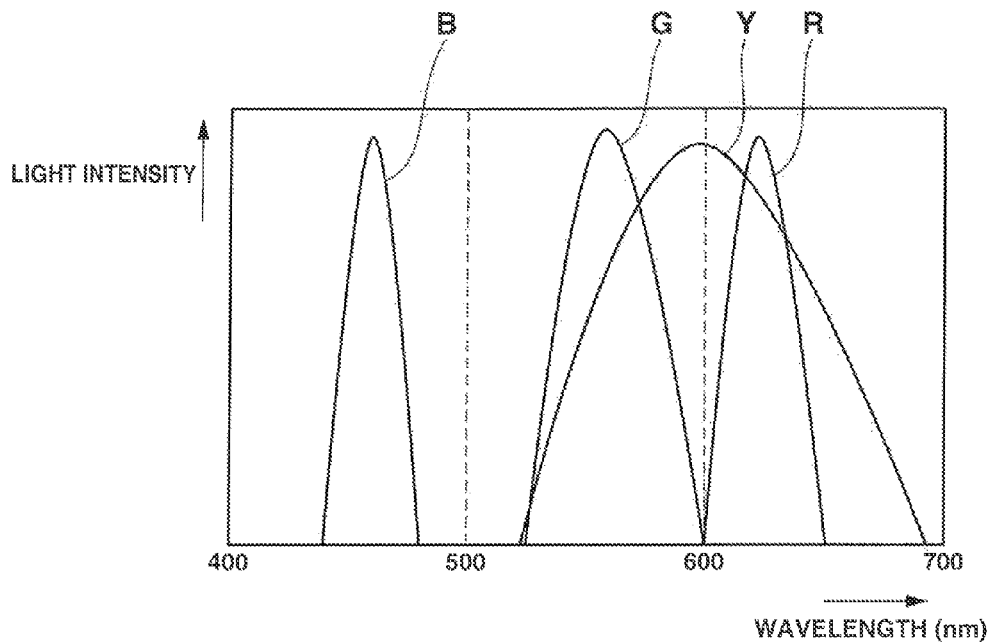
FIG. 6A is a diagram showing optical characteristics of wavelength ranges of light according to the first embodiment of the invention.

FIG. 6A is a diagram showing optical characteristics of light in the ranges of red, yellow, green and blue wavelengths emitted from the corresponding luminescent material layers. In this figure, the axis of abscissa denotes light intensity, and the axis of ordinate denotes wavelength. Wavelength ranges where the optical characteristics are distributed differ depending on colors of light. An optical characteristic B of light in the range of blue wavelengths is distributed in a wavelength range of about 440 nm to about 480 nm. An optical characteristic G of light in the range of green wavelengths is distributed in a wavelength range of about 520 nm to about 600 nm. An optical characteristic R of light in the range of red wavelengths is distributed in a wavelength range of about 600 nm to about 660 nm. An optical characteristic Y of light in the range of yellow wavelengths is distributed in a wavelength range of about 515 nm to about 680 nm. Consequently, the optical characteristic Y of light in the range of yellow wavelengths includes the optical characteristics G, R of light in the range of green wavelengths and light in the range of red wavelengths.

Figure 6B:
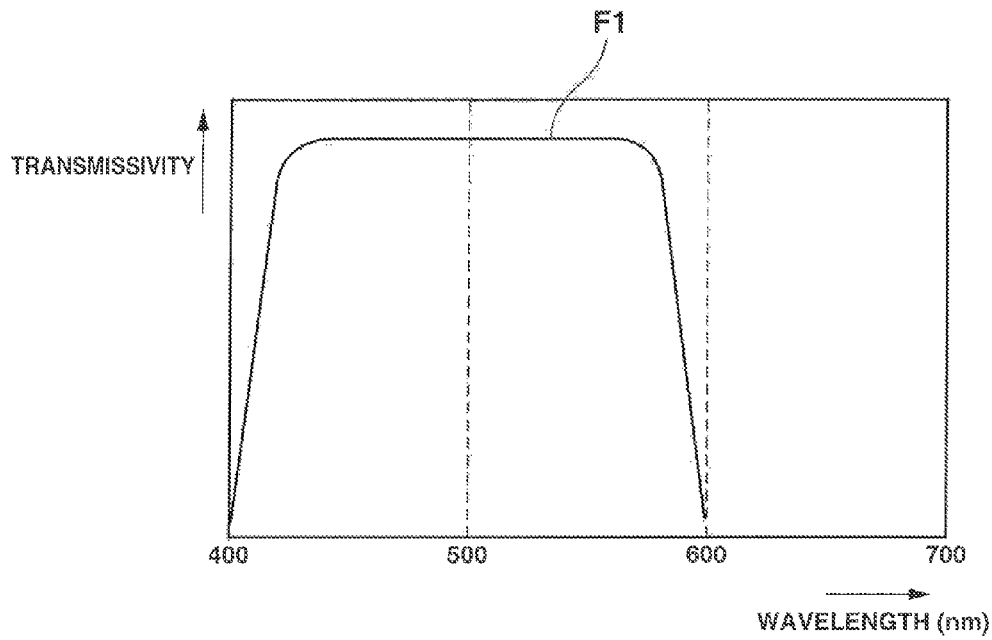
FIG. 6B is a diagram showing a transmission characteristic of a blue and green light transmission area according to the first embodiment of the invention.

FIG. 6B is a diagram showing a light transmission characteristic of the blue and green light transmission area 420. In this figure, the axis of abscissa denotes light intensity, and the axis of ordinate denotes wavelength. A high transmissivity area means that light in a range of wavelengths is easily transmitted therethrough. The blue and green light transmission area 420 of this embodiment has a transmission characteristic F in which most of light in a range of wavelengths distributed from about 400 nm to about 600 nm is transmitted therethrough. Consequently, the blue and green light transmission area 420 transmits most of light in the range of blue wavelengths and light in the range of green wavelengths having the optical characteristics B, G, respectively, shown in FIG. 6A. On the other hand, light in ranges of other wavelengths such as light in the range of red wavelength that is situated at a longer wavelength side of the optical characteristic G of light in the range of green wavelengths is cut off by the blue and green light transmission area 420.

Next, the control of the luminescent wheel 101 and the color wheel 201 according to this embodiment will be described. The light source unit 60, and the luminescent wheel 101 and the color wheel 201 which make up part of the light source unit 60 are controlled by the control module 38.

Figure 7:
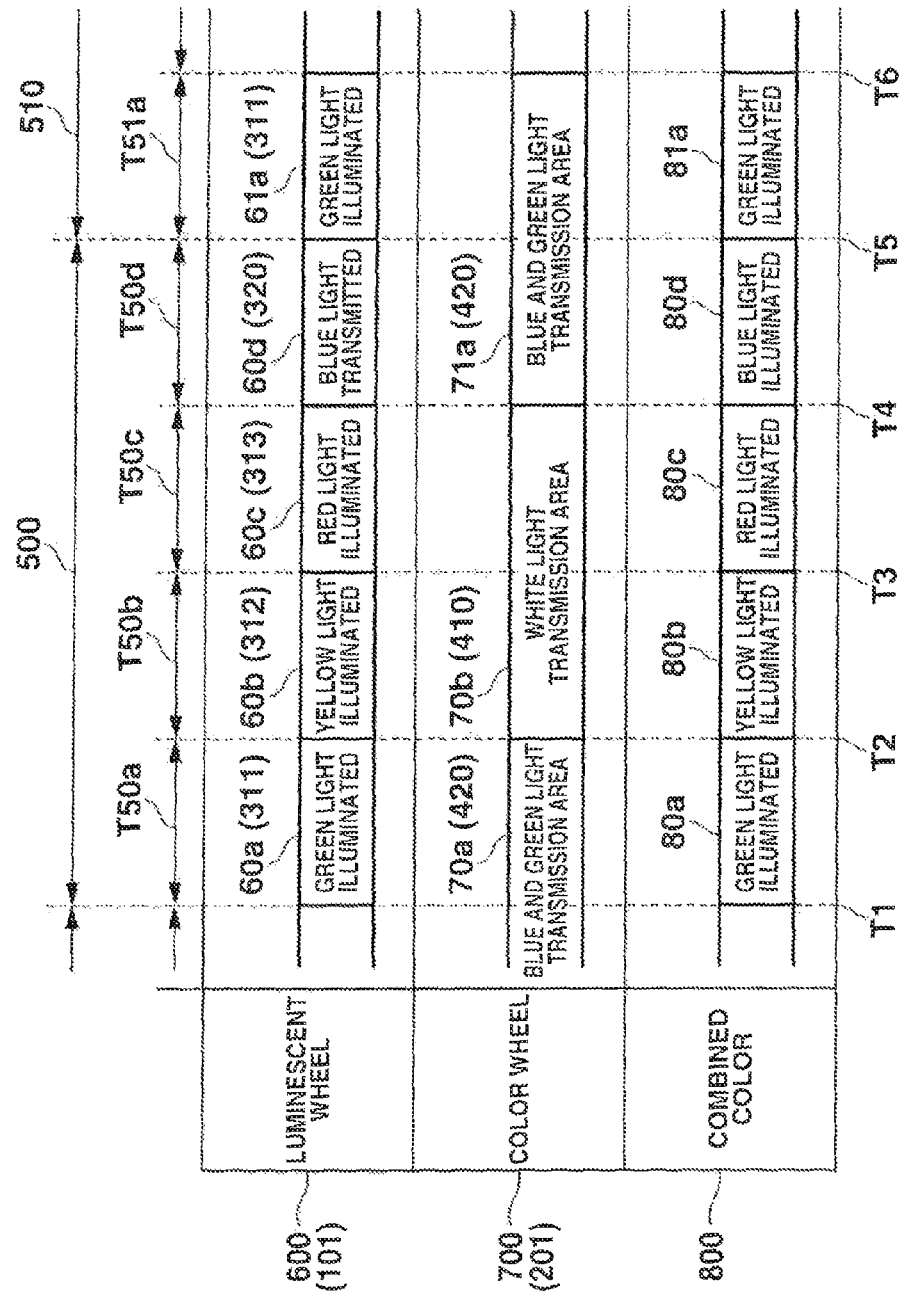
FIG. 7 is a timing chart of a first projection mode according to the first embodiment of the invention.

FIG. 7 is a timing chart of a first projection mode according to this embodiment. In the first projection mode, the projector 10 forms a projected image using the four colors of light and projects the projected image on to a screen. The light source unit 60 forms one image to be projected every frame unit period 500 and projects continuously a plurality of projected images in a time-sharing fashion. In addition, the light source unit 60 divides the frame unit period 500 into a first output period T50*a*, a second output period T50*b*, a third output period T50*c* and a fourth output period T50*d* in that order and outputs the colors of light which are allocated to the output periods.

In the first projection mode, light in the range of blue wavelengths from the excitation light shining device 70 is shone on to the green luminescent material layer 311, the yellow luminescent material layer 312, the red luminescent material layer 313 and the transmission area 320 on the luminescent wheel 101 in the first output period T50*a*, the second output period T50b, the third output period T50c and the fourth output period T50d, respectively. The color wheel 201 is controlled so that light from the luminescent wheel 101 is shone on to the blue and green light transmission area 420 in the first output period T50a and the fourth output period T50d, and the color wheel 201 is controlled so that light from the luminescent wheel 101 is shone on to the white light transmission area 410 in the second output period T50b and the third output period T50c.

Namely, the luminescent wheel 101 shown in FIG. 4 is controlled so that positions on the luminescent wheel 101 on to which light in the range of blue wavelengths from the blue laser diodes 71 is shone coincide with the first boundary B1, the second boundary B2, the third boundary B3 and the fourth boundary B4 at a first switching timing T1, a second switching timing T2, a third switching timing T3 and a fourth switching timing T4, respectively. In addition, the color wheel 201 shown in FIG. 5 is controlled so that positions on the color wheel 201 on to which light from the luminescent wheel 101 is shone coincide with the fifth boundary B5 and the sixth boundary B6 at the second switching timing T2 and the fourth switching timing T4, respectively. Hereinafter, the output periods will be described individually.

As shown in FIG. 7, light in the range of blue wavelengths passes sequentially the luminescent wheel 600 (101) and the color wheel 700 (201) in that order, and a combined color 800 of light is emitted for use to form a projected image. In the first output period T50a that starts from the first switching timing T1, light in the range of blue wavelengths is shone on to the green luminescent material layer 311, whereby the luminescent wheel 600 outputs light 60a in the range of green wavelengths. Since a blue and green light transmission area 70a transmits light in the range of green wavelengths, the color wheel 700 transmits the light 60a in the range of green wavelengths that is emitted from the luminescent wheel 600. Thus, the light source unit 60 emits light 80a in the range of green wavelengths as a combined color 800 of light in the first output period T50a.

In the second output period T50b that starts from the second switching timing T2, light in the range of blue wavelengths is shone on to the yellow luminescent material layer 312, whereby the luminescent wheel 600 outputs light 60b in the range of yellow wavelengths. Since a white light transmission area 70b transmits light in the range of yellow wavelengths, the color wheel 700 transmits the light 60b in the range of green wavelengths that is emitted from the luminescent wheel 600. Thus, the light source unit 60 emits light 80b in the range of yellow wavelengths as a combined color 800 of light in the second output period T50b.

In the third output period T50c that starts from the third switching timing T3, light in the range of blue wavelengths is shone on to the red luminescent material layer 313, whereby the luminescent wheel 600 outputs light 60c in the range of red wavelengths. Since the white light transmission area 70b transmits light in the range of red wavelengths, the color wheel 700 transmits the light 60c in the range of red wavelengths that is emitted from the luminescent wheel 600. Thus, the light source unit 60 emits light 80c in the range of red wavelengths as a combined color 800 of light in the third output period T50c.

In the fourth output period T50d that starts from the fourth switching timing T4, light in the range of blue wavelengths passes through the transmission area 320 of the luminescent wheel 600, whereby the luminescent wheel 600 outputs light 60d in the range of blue wavelengths. Since a blue and green light transmission area 71a transmits light in the range of blue wavelengths, the color wheel 700 transmits the light 60d in the range of blue wavelengths that is emitted from the luminescent wheel 600. Thus, the light source unit 60 emits light 80d in the range of blue wavelengths as a combined color 800 of light in the fourth output period 50d.

When the fourth output period T50d has elapsed, a first output period T51a of the next frame unit period 510 starts. In the first output period T51a, as in the case with the first output period T50a described above, the light source unit 60 controls the luminescent wheel 600 and the color wheel 700 so that the corresponding areas thereof are disposed accordingly and emits light 81a in the range of green wavelengths as a combined color 800 of light. From this period on, the same processes will be repeated.

Figure 8:
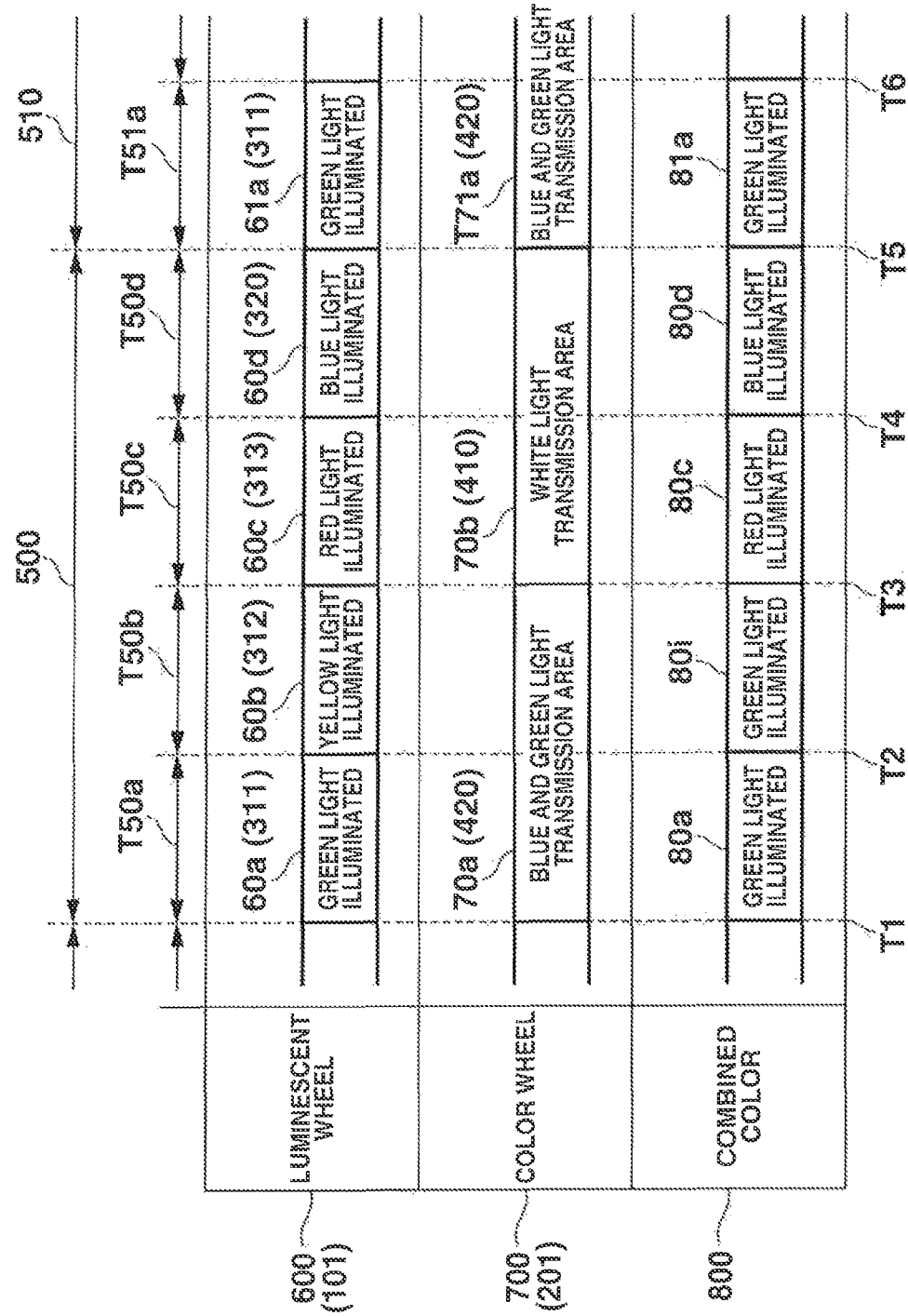
FIG. 8 is a timing chart of a second projection mode of the first embodiment of the invention.

FIG. 8 is a timing chart of a second projection mode of this embodiment. In the second projection mode, the projector 10 forms a projected image using the three primary colors of light source light and projects the projected image so formed on to the screen.

In the second projection mode, the luminescent wheel 101 is controlled so that the luminescent wheel 101 emits light in similar ranges of wavelengths to those of the first projection mode in the first, second, third and fourth output periods T50a, T50b, T50c, T50d. The color wheel 201 is controlled so that light from the luminescent wheel 101 is shone on to the blue and green light transmission area 420 in the first output period T50a and the second output period T50b. The color wheel 201 is controlled so that light from the luminescent wheel 101 is shone on to the white light transmission area 410 in the third output period T50c and the fourth output period T50d.

Namely, the positions on the luminescent wheel 101 shown in FIG. 4 on to which light in the range of blue wavelengths from the blue laser diodes 71 is shone are controlled in the same way as that of the first projection mode at the first switching timing T1, the second switching timing T2, the third switching timing T3 and the fourth switching timing T4. In addition, the color wheel 201 shown in FIG. 5 is controlled so that the positions on the color wheel 201 on to which light from the luminescent wheel 101 is shone coincide with the sixth boundary B6 and the fifth boundary B5 at the first switching timing T1 and the third switching timing T3, respectively. Namely, the luminescent wheel 101 and the color wheel 201 are controlled in the ways described above with their original positions offset relatively. Hereinafter, the output periods will be described individually.

As shown in FIG. 8, in the first output period T50a that starts from the first switching timing T1, light in the range of blue wavelengths is shone on to the green luminescent material layer 311, whereby the luminescent wheel 600 outputs light 60a in the range of green wavelengths. Since the blue and green light transmission area 70a transmits light in the range of green wavelengths, the color wheel 700 transmits the light 60a in the range of green wavelengths that is emitted from the luminescent wheel 600. Thus, the light source unit 60 emits light 80a in the range of green wavelengths as a combined color 800 of light in the first output period T50a.

In the second output period T50b that starts from the second switching timing T2, light in the range of blue wavelengths is shone on to the yellow luminescent material layer 312, whereby the luminescent wheel 600 outputs light 60b in the range of yellow wavelengths. As shown in FIG. 6B, the blue and green light transmission area 70a transmits light in the range of green wavelengths and cuts off light in the range of red wavelengths. Because of this, the color wheel 700 cuts off, in wavelength components of the light 60*b* in the range of yellow wavelengths emitted from the luminescent wheel 600, a wavelength component corresponding to light in the range of red wavelengths. Thus, the light source unit 60 emits light 80*i* in the range of green wavelengths as a combined color 800 of light in the second output period T50*b*.

In the third output period T50*c* that starts from the third switching timing T3, light in the range of blue wavelengths is shone on to the red luminescent material layer 313, whereby the luminescent wheel 600 outputs light 60*c* in the range of red wavelengths. Since the white light transmission area 70*b* transmits light in the range of red wavelengths, the color wheel 700 transmits the light 60*c* in the range of red wavelengths that is emitted from the luminescent wheel 600. Thus, the light source unit 60 emits light 80*c* in the range of red wavelengths as a combined color 800 of light in the third output period T50*c*.

In the fourth output period T50*d* that starts from the fourth switching timing T4, light in the range of blue wavelengths passes through the transmission area 320 of the luminescent wheel 600, whereby the luminescent wheel 600 emits light 60*d* in the range of blue wavelengths. Since the white light transmission area 71*b* transmits light in the range of blue wavelengths, the color wheel 700 transmits the light 60*d* in the range of blue wavelengths that is emitted from the luminescent wheel 600. Thus, the light source unit 60 emits light 80*d* in the range of blue wavelengths as a combined color 800 of light in the fourth output period T50*d*.

When the fourth output period T50*d* has elapsed, a first output period T51*a* of the next frame unit period 510 starts. In the first output period T51*a*, as in the case with the first output period T50*a* described above, the light source unit 60 controls the luminescent wheel 600 and the color wheel 700 so that the corresponding areas thereof are disposed accordingly and emits light 81*a* in the range of green wavelengths as a combined color 800 of light. From this period on, the same processes will be repeated.

In this way, in this embodiment, in the first projection mode, the light source unit 60 can output the green light, the yellow light, the red light and the blue light in a time-sharing fashion to form a projected image. In addition, in the second projection mode, in the second output period T50*d*, too, the light source unit 60 outputs the light 80*i* in the range of green wavelengths as done in the first output period T50*a*.

Consequently, in the second projection mode, the light source unit 60 can emit the green light, the red light and the blue light in the time-sharing fashion.

Second Embodiment

Next, a second embodiment of the invention will be described. In this embodiment, in place of the blue and green light transmission area 420 that is provided on the color wheel 201 shown in FIG. 5, a red and blue light transmission area (a first transmission area) is provided on a color wheel 201 in the same position as the position where the blue and green light transmission area 420 is provided. The red and blue light transmission area has a different light transmission characteristic from that of the blue and green light transmission area 420 shown in FIG. 6B. In a second projection mode, a light source unit 60 outputs light in the range of red wavelengths in two output periods.

Figure 9:
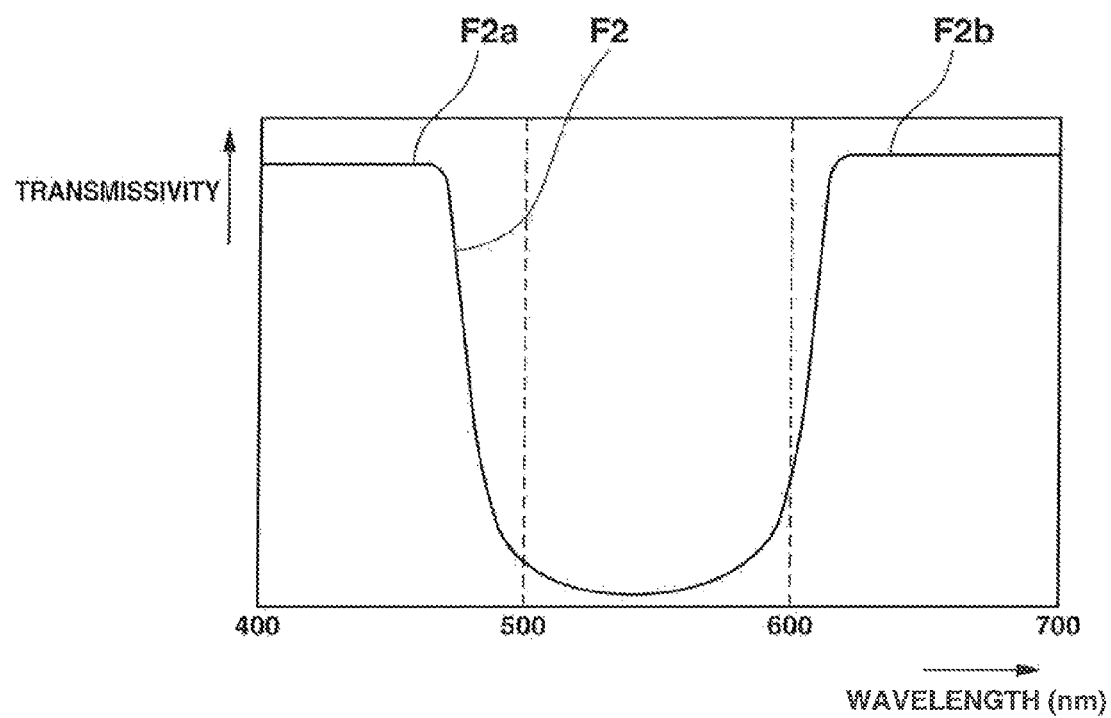
FIG. 9 is a diagram showing a transmission characteristic of a red and blue light transmission area according to a second embodiment of the invention.

FIG. 9 is a diagram showing a light transmission characteristic of the red and blue light transmission area that is provided on the color wheel 201. In this figure, an axis of ordinate denotes transmissivity, and an axis of abscissa denotes wavelength. A light transmission characteristic F2 of the red and blue light transmission area has a blue light transmission band F2*a* that transmits light in the range of blue wavelengths and a red light transmission band F2*b* that transmits light in the range of red wavelengths. The blue light transmission band F2*a* transmits most of light existing in a range of wavelengths smaller than about 480 nm. The red light transmission band F2*b* transmits most of light existing in a range of wavelengths greater than about 600 nm. Namely, most of light existing in a range of wavelengths from about 480 nm to about 600 nm is cut off in the red and blue light transmission area having the transmission characteristic F2. Consequently, the red and blue light transmission area of the color wheel 201 transmits light in the range of blue wavelengths and light in the range of red wavelengths that have the optical characteristics B, R shown in FIG. 6A. On the other hand, light in the range of green wavelengths that is distributed in a range of wavelengths that lies between the light in the range of blue wavelengths and the light in the range of red wavelengths is cut off by a red and green light transmission area.

Figure 10:
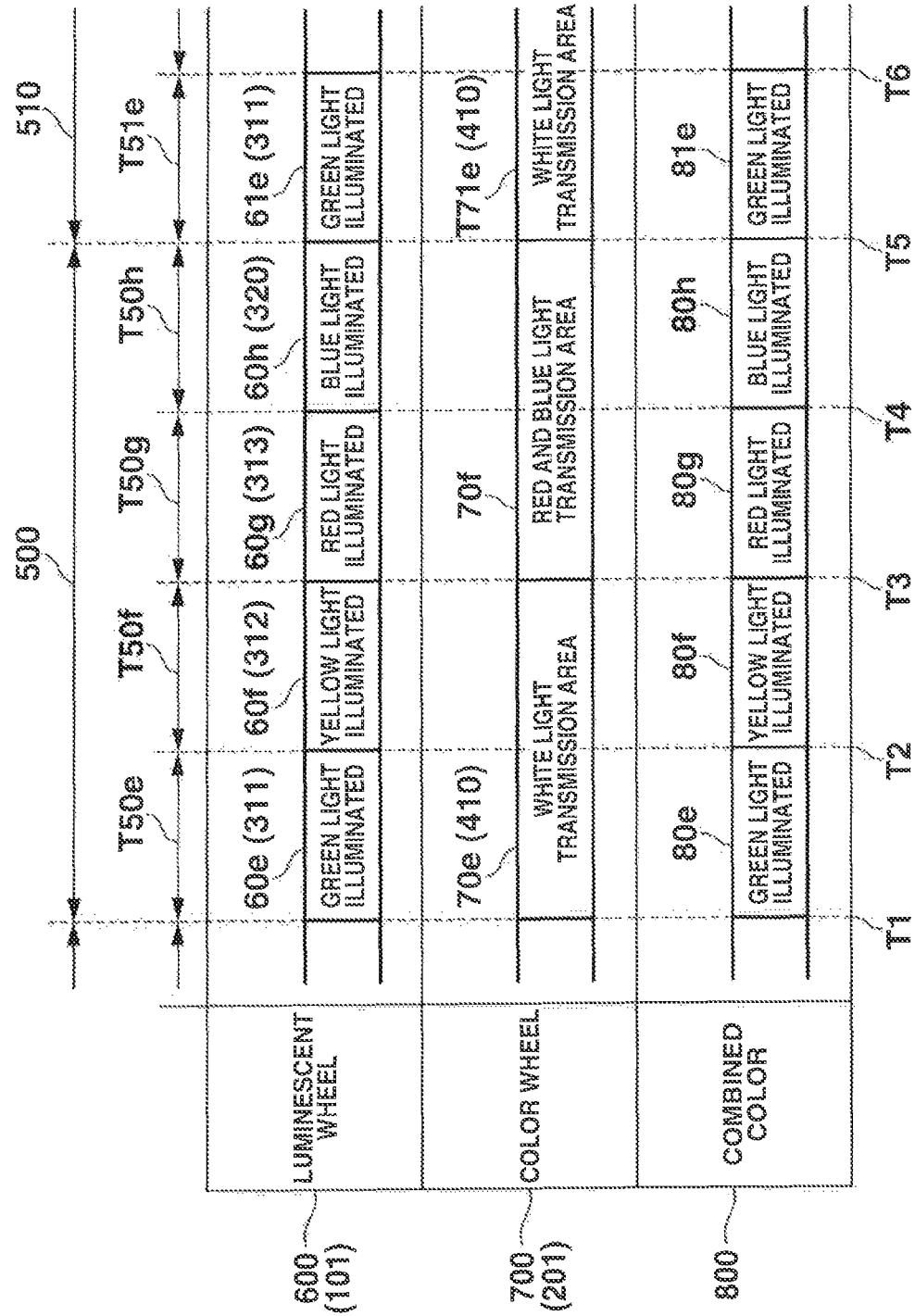
FIG. 10 is a timing chart of a first projection mode according to the second embodiment of the invention.

FIG. 10 is a timing chart of a first projection mode according to this embodiment. In the first projection mode, as in the case with the first embodiment, a projector 10 forms a projected image using the four colors of light source light and projects the projected image on to a screen.

As in the case with the first embodiment, in the first projection mode, light in the range of blue wavelengths that is emitted from the excitation light shining device 70 is shone on to a green luminescent material layer 311, a yellow luminescent material layer 312, a red luminescent material layer 313 and a transmission area 320 in a first output period T50*e*, a second output period T50*f*, a third output period T50*g* and a fourth output period T50*h*, respectively. The color wheel 201 is controlled so that light from a luminescent wheel 101 is shone on to a white light transmission area 410 in the first output period T50*e* and the second output period T50*f*, and the color wheel 201 is controlled so that light from the luminescent wheel 101 is shone on to the red and blue light transmission area in the third output period T50*g* and the fourth output period T50*h*.

Namely, positions on the luminescent wheel 101 shown in FIG. 4 on to which light in the range of blue wavelengths from blue laser diodes 71 is shone are controlled in a similar way to that in the first embodiment at a first switching timing T1, a second switching timing T2, a third switching timing T3 and a fourth switching timing T4. In addition, the color wheel 201 shown in FIG. 5 is controlled so that positions on the color wheel 201 on to which light from the luminescent wheel 101 is shone coincide with a sixth boundary B6 and a fifth boundary B5 at the first switching timing T1 and the third switching timing T3, respectively. Hereinafter, the output periods will be described individually.

As shown in FIG. 10, in the first output period T50*e* that starts from the first switching timing T1, light in the range of blue wavelengths is shone on to the green luminescent material layer 311, whereby the luminescent wheel 600 outputs light 60*e* in the range of green wavelengths. Since a white light transmission area 70*e* transmits light in the range of green wavelengths, the color wheel 700 transmits the light 60*e* in the range of green wavelengths that is emitted from the luminescent wheel 600. Thus, the light source unit 60 emits light 80*e* in the range of green wavelengths as a combined color 800 of light in the first output period T50*e*.

In the second output period T50*f* that starts from the second switching timing T2, light in the range of blue wavelengths is shone on to the yellow luminescent material layer 312, whereby the luminescent wheel 600 outputs light 60f in the range of yellow wavelengths. Since the white light transmission area 70e transmits light in the range of yellow wavelengths, the color wheel 700 transmits the light 60f in the range of green wavelengths that is emitted from the luminescent wheel 600. Thus, the light source unit 60 emits light 80f in the range of yellow wavelengths as a combined color 800 of light in the second output period T50f.

In the third output period T50g that starts from the third switching timing T3, light in the range of blue wavelengths is shone on to the red luminescent material layer 313, whereby the luminescent wheel 600 outputs light 60g in the range of red wavelengths. Since the red and blue light transmission area transmits light in the range of red wavelengths as shown in FIG. 9, the color wheel 700 transmits the light 60g in the range of red wavelengths that is emitted from the luminescent wheel 600. Thus, the light source unit 60 emits light 80g in the range of red wavelengths as a combined color 800 of light in the third output period T50g.

In the fourth output period T50h that starts from the fourth switching timing T4, light in the range of blue wavelengths passes through the transmission area 320 of the luminescent wheel 600, whereby the luminescent wheel 600 outputs light 60h in the range of blue wavelengths. Since a red and blue light transmission area 70f transmits light in the range of blue wavelengths, the color wheel 700 transmits the light 60h in the range of blue wavelengths that is emitted from the luminescent wheel 600. Thus, the light source unit 60 emits light 80h in the range of blue wavelengths as a combined color 800 of light in the fourth output period T50h.

When the fourth output period T50h has elapsed, a first output period T51e of the next frame unit period 510 starts. In the first output period T51e, as in the case with the first output period T50e described above, the light source unit 60 controls the luminescent wheel 600 and the color wheel 700 so that the corresponding areas thereof are disposed accordingly and emits light 81e in the range of green wavelengths as a combined color 800 of light. From this period on, the same processes will be repeated.

Figure 11:
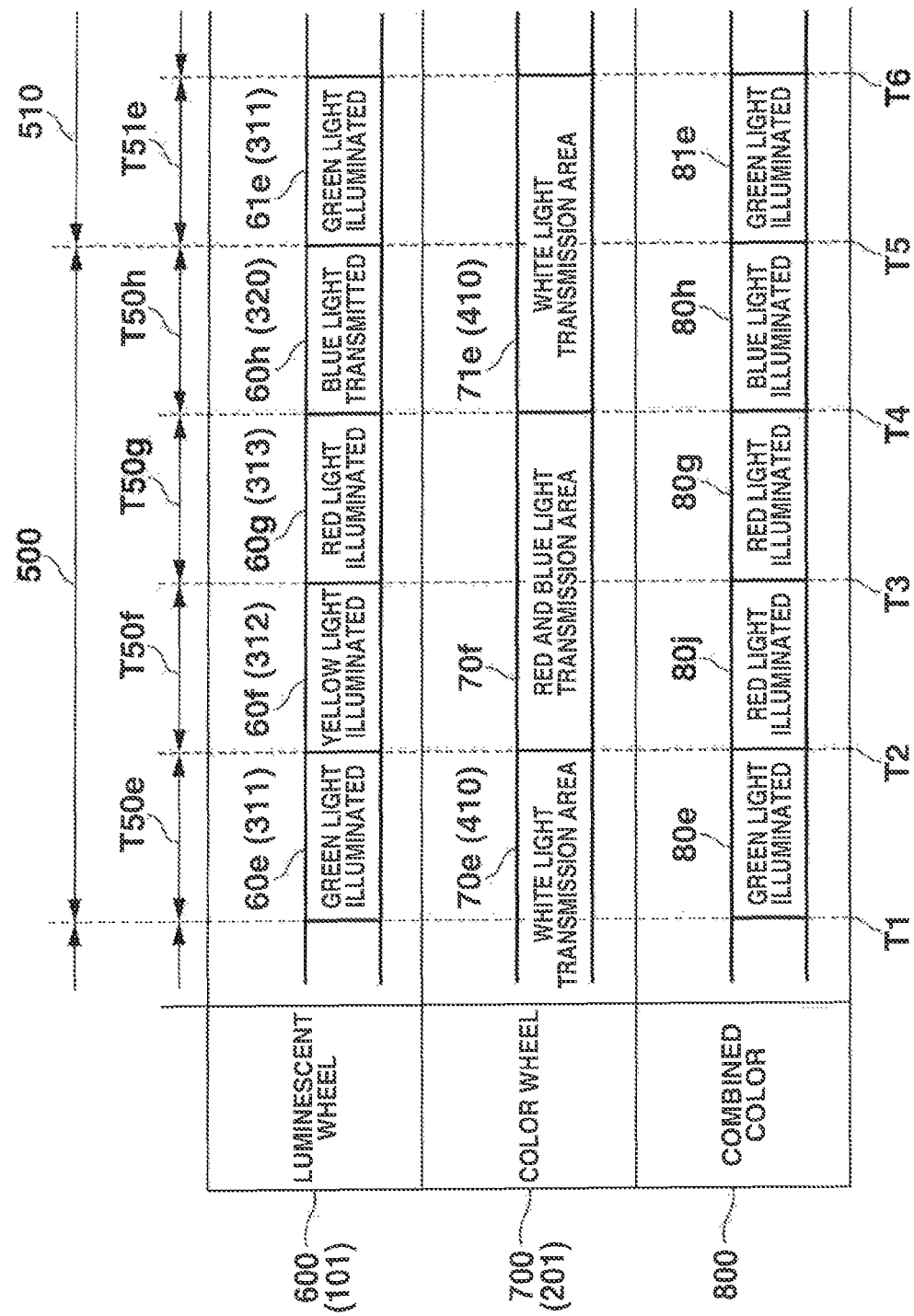
FIG. 11 is a timing chart of a second projection mode of the second embodiment of the invention.

FIG. 11 is a timing chart of a second projection mode of this embodiment. In the second projection mode, as in the case with the first embodiment, the projector 10 forms a projected image using the three primary colors of light source light and projects the projected image so formed on to the screen.

In the second projection mode, the luminescent wheel 101 is controlled in a similar way to that of the first embodiment in the first, second, third and fourth output periods T50e, T50f, T50g, T50h. The color wheel 201 is controlled so that light from the luminescent wheel 101 is shone on to the white light transmission area 410 in the first output period T50e and the fourth output period T50h. The color wheel 201 is controlled so that light from the luminescent wheel 101 is shone on to the red and blue light transmission area 420 in the second output period T50f and the third output period T50g.

Namely, the positions on the luminescent wheel 101 shown in FIG. 4 on to which light in the range of blue wavelengths from the blue laser diodes 71 is shone are controlled in the same way as that of the first projection mode at the first switching timing T1, the second switching timing T2, the third switching timing T3 and the fourth switching timing T4. In addition, the color wheel 201 shown in FIG. 5 is controlled so that the positions on the color wheel 201 on to which light from the luminescent wheel 101 is shone coincide with the fifth boundary B5 and the sixth boundary B6 at the second switching timing T2 and the fourth switching timing T4, respectively. Hereinafter, the output periods will be described individually.

As shown in FIG. 11, in the first output period T50e that starts from the first switching timing T1, light in the range of blue wavelengths is shone on to the green luminescent material layer 311, whereby the luminescent wheel 600 outputs light 60e in the range of green wavelengths. Since the white light transmission area 70e transmits light in the range of green wavelengths, the color wheel 700 transmits the light 60e in the range of green wavelengths that is emitted from the luminescent wheel 600. Thus, the light source unit 60 emits light 80e in the range of green wavelengths as a combined color 800 of light in the first output period T50e.

In the second output period T50f that starts from the second switching timing T2, light in the range of blue wavelengths is shone on to the yellow luminescent material layer 312, whereby the luminescent wheel 600 outputs light 60f in the range of yellow wavelengths. As shown in FIG. 9, the red and blue light transmission area 70f transmits light in the range of red wavelengths and cuts off light in the range of green wavelengths. Because of this, the color wheel 700 cuts off, in wavelength components of the light 60f in the range of yellow wavelengths emitted from the luminescent wheel 600, a wavelength component corresponding to light in the range of green wavelengths. Thus, the light source unit 60 emits light 80j in the range of red wavelengths as a combined color 800 of light in the second output period T50f.

In the third output period T50g that starts from the third switching timing T3, light in the range of blue wavelengths is shone on to the red luminescent material layer 313, whereby the luminescent wheel 600 outputs light 60g in the range of red wavelengths. Since the red and blue light transmission area 70f transmits light in the range of red wavelengths, the color wheel 700 transmits the light 60g in the range of red wavelengths that is emitted from the luminescent wheel 600. Thus, the light source unit 60 emits light 80g in the range of red wavelengths as a combined color 800 of light in the third output period T50g.

In the fourth output period T50h that starts from the fourth switching timing T4, light in the range of blue wavelengths passes through the transmission area 320 of the luminescent wheel 600, whereby the luminescent wheel 600 emits light 60h in the range of blue wavelengths. Since the white light transmission area 71e transmits light in the range of blue wavelengths, the color wheel 700 transmits the light 60h in the range of blue wavelengths that is emitted from the luminescent wheel 600. Thus, the light source unit 60 emits light 80h in the range of blue wavelengths as a combined color 800 of light in the fourth output period T50h.

When the fourth output period T50h has elapsed, a first output period T51e of the next frame unit period 510 starts. In the first output period T51e, as in the case with the first output period T50e described above, the light source unit 60 controls the luminescent wheel 600 and the color wheel 700 so that the corresponding areas thereof are disposed accordingly and emits light 81e in the range of green wavelengths as a combined color 800 of light. From this period on, the same processes will be repeated.

In this way, in this embodiment, in the first projection mode, the light source unit 60 can output the green light, the yellow light, the red light and the blue light in a time-sharing fashion. In addition, in the second projection mode, in the second output period T50f, too, the light source unit 60 can output the light 80j in the range of red wavelengths as done in the third output period T50g. Consequently, in the second projection mode, the light source unit 60 can emit the green light, the red light and the blue light in the time-sharing fashion.

The output periods (the first output period, the second output period, the third output period and the fourth output period) in the frame unit period described in the embodiments that have been described heretofore can emit the light in the ranges of wavelengths that correspond to the output periods, respectively. Therefore, the blue laser diodes 71 (the excitation light shining device 70) are controlled by the control module 38 so that light in the range of blue wavelengths is shone on to the light source segments for an arbitrary period of time in part or the whole of the output periods.

The light source unit 60 can change the emitting time individually in the plurality of output periods when light in the range of wavelengths of the same color is emitted or collectively as regarding the plurality of output periods as a single output period. This can control the luminance appropriately. The plurality of output periods when light in the range of wavelengths of the same color is emitted means the plurality of output periods when the light from the luminescent wheel 101 is caused to enter the blue and green light transmission area or the red and blue light transmission area (the first transmission area) in the output periods when light in the range of green wavelengths, light in the range of yellow wavelengths and light in the range of red wavelengths are excited in the second projection mode.

For example, in the case of the second projection mode in the first embodiment (refer to FIG. 8), compared with the light 80a in the range of green wavelengths that is outputted in the first output period T50a, the light 80i in the range of green wavelengths that is output in the second output period T50b utilizes the light obtained from the different luminous light, and therefore, there may be a case where although the projection time is the same, the tint or luminance differs. Even in such a case, the control unit 60 can control the output time of the light 80a in the range of green wavelengths and the light 80i in the range of green wavelengths that are the combined color 800 of light so as to be increased or decreased by the same length of time individually in the two output periods T50a, T50b. By doing so, it is possible to reduce the risk of reduction in color reproduction capability that would otherwise be caused by difference in tint or luminance of light in the range of green wavelengths that is projected by the projector 10.

In case the tint and luminance in the output period T50a are substantially the same as those in the output period T50b, regarding both the output periods T50a, T50b as a single output period, the control unit 60 can control the emitting time of the light 80a in the range of green wavelengths and the light 80i in the range of green wavelengths. Also, in the second projection mode of the second embodiment, as with the case described above, the light source unit 60 can control the emitting time of the light 80j in the range of green wavelengths and the light 80g in the range of green wavelengths individually in the output periods T50f, T50g.

The lengths of the output periods T50a, T50b, T50c, T50d in the frame unit period 500 may be identical to or different from one another depending on the luminance of each light source light or the white balance of the projected image provided that the embodiments can be carried out.

In the event that the blue laser diodes 71 are illuminated at the switching timings T1 to T6, light in the range of blue wavelengths from the blue laser diodes 71 is shone on to anyone of the boundaries B1, B2, B3, B4 on the luminescent wheel. As this occurs, there are fears that mixing in color occurs in the light emanating from the luminescent wheel 101. To prevent the occurrence of such mixing in color, it is desirable to stop the illumination of the blue laser diodes 71 in this color mixing period (the period when light in the range of blue wavelengths could be shone on to the boundaries B1 to B4). In the second projection mode in the second embodiment, however, the blue laser diodes 71 can be kept illuminated to thereby reduce the risk of reduction in luminance. Namely, the two output periods when light in the range of wavelengths of the same color is emitted are disposed continuously. Thus, in the light in the range of green wavelength, the light in the range of yellow wavelengths and the light in the range of red wavelengths, a plurality of incident lights that are to be incident on the blue and green light transmission area or the red and blue light transmission area (the first transmission area) can be kept emitted in the color mixing period. For example, the blue laser diodes 71 can be kept illuminated over the second switching timing T2 shown in FIG. 8 or the third switching timing T3 shown in FIG. 11.

The luminescent wheel 101 may include a cyan luminescent material layer that emits light in a range of cyan wavelengths in place of the yellow luminescent material layer 312. The light in the range of cyan wavelengths includes the wavelength range of light in the range of blue wavelengths and the wavelength range of light in the range of green wavelengths. In this case, the cyan luminescent material layer is disposed between the light source segment that emits light in the range of blue wavelengths and the light source segment that emits light in the range of green wavelengths on the luminescent wheel 101. The color wheel 201 includes the red and blue light transmission area in place of the blue and green light transmission area in the first embodiment and includes a green and red light transmission area in place of the red and blue light transmission area in the second embodiment.

Further, the luminescent wheel 101 may include a magenta luminescent material layer that emits light in a range of magenta wavelengths in place of the yellow luminescent material layer 312. The light in the range of magenta wavelengths includes the wavelength range of light in the range of red wavelengths and the wavelength range of light in the range of blue wavelengths. In this case, the magenta luminescent material layer is disposed between the light source segment that emits light in the range of red wavelengths and the light source segment that emits light in the range of blue wavelengths on the luminescent wheel 101. The color wheel 201 includes the green and red light transmission area in place of the blue and green light transmission area in the first embodiment and includes the blue and green light transmission area in place of the red and blue light transmission area in the second embodiment.

Thus, as has been described heretofore, the light source unit 60 according to the embodiments of the invention control the luminescent wheel 101 and the color wheel 201 so that the luminescent wheel 101 and the color wheel 201 are synchronized with each other and controls the light source so that light is sequentially shone on to the plurality of light source segments. Consequently, it is possible to reduce the risk of reduction in luminance in the projected image formed.

In addition, the light source unit 60 emits the light in the range of red wavelengths, the light in the range of green wavelengths, the light in the range of blue wavelengths and the light in the range of cyan wavelengths or the light in the range of magenta wavelengths or the light in the range of yellow wavelengths and can form a projected image by making use of the various types of light source light. Thus, the light source unit 60 can be given the superior color reproduction capability.

The light source unit 60 including the first projection mode and the second projection mode can change the projection modes by changing the timing at which the rotation of the luminescent wheel 600 is synchronized with the rotation of the color wheel 700, that is, changing the relative positions of the luminescent wheel 600 and the color wheel 700 without changing the configurations in the luminescent wheel 600 and the color wheel 700. Thus, the projection modes can easily be changed. In addition, in either of the projection modes, since all the light source segments of the color wheel 700 can be made use of, it is possible to reduce the risk of reduction in luminance that would otherwise be caused as a result of the projection modes being changed.

The light source unit 60 including the white light transmission area and the blue and green light transmission area on the color wheel 201 can extend the emitting period of the light in the range of green wavelengths. Thus, the light source unit 60 can form the projected image having appropriate luminance when attempting to enhance the intensity of luminous light generated in the green luminous material layer.

The light source unit 60 including the white light transmission area and the red and blue light transmission area on the color wheel 201 can extend the emitting period of the light in the range of red wavelengths. Thus, the light source unit 60 can form the projected image having appropriate luminance when attempting to enhance the intensity of luminous light generated in the red luminous material layer.

In the light source unit 60 in which the light in the range of green wavelengths, the light in the range of yellow wavelengths, the light in the range of red wavelengths and the light in the range of blue wavelengths are emitted from the luminescent wheel, the light in the range of green wavelengths, the light in the range of yellow wavelengths, the light in the range of red wavelengths and the light in the range of blue wavelengths can be used to form the image in the first projection mode, and the light in the range of green wavelengths, the light in the range of red wavelengths and the light in the range of blue wavelengths can be used to form the projected image in the second projection mode.

In the light source unit 60 that includes the luminescent wheel 101 on which the green luminescent material layer 311, the yellow luminescent material layer 312, the red luminescent material layer 313 and the transmission area 320 are formed, the light in the range of green wavelengths, the light in the range of yellow wavelengths and the light in the range of red wavelengths can be emitted in the form of luminous light, and the light in the range of blue wavelengths can be emitted by making use of the light emitted from the blue laser diodes 71. Thus, the semiconductor light emitting device can be made up of the single type of semiconductor light emitting device.

In the light source unit 60 in which the light in the range of wavelengths of the same color is emitted in the plurality of output periods and the plurality of output periods are regarded as the individual output periods or as the single output period, even in the event that the projected image is formed in the second projection mode, the risk of reduction in luminance of the projected image can be reduced.

In the light source unit 60 in which the light in the range of wavelengths of the same color is emitted in the plurality of output periods and is kept emitted even in the color mixing periods, even in the event that the projected image is formed in the second projection mode, the risk of reduction in luminance of the projected image can be reduced.

In the embodiments described above, the excitation light shining device 70 is used as the light source of light in the range of blue wavelengths, and the excitation light shining device 70 is made up of the plurality of semiconductor light emitting elements which are the blue laser diodes 71 and functions as the excitation light source. In addition, the transmission area 320 is described as being provided on the luminescent wheel 101 so as to transmit light in the range of blue wavelengths. However, the invention is not limited thereto. For example, a configuration may be adopted in which the transmission area is removed from the luminescent wheel 101 so that the luminous light emitting area 310 is formed along the full circumference of the luminescent wheel 101 and a blue laser diode is provided separately as a light source for emitting light in the range of blue wavelengths.

The color wheel 201 that is separated from the luminescent wheel 101 is described as having the first transmission area (the blue and green light transmission area 420 or the red and blue light transmission area) that transmits, invisible light, light in the certain range of wavelengths and the second transmission area (the white light transmission area 410) that transmits the whole range of visible light. However, the invention is not limited thereto. The second transmission area of the color wheel 201 does not have to transmit the whole range of visible light, provided that the second transmission area is such that it transmits light in a range of wavelengths that is broader than that of light that is transmitted through the first transmission area.

The embodiments that have been described heretofore are presented as the examples, and there is no intention to limit the scope of the invention by the embodiments. The novel embodiments can be carried out in various forms, and various omissions, replacements and modifications or alterations can be made to the embodiments without departing from the spirit and scope of the invention. The resulting embodiments and their modifications are included in the spirit and scope of the invention and are included in the scope of inventions claimed under claims and their equivalents.

What is claimed is:

1. A light source unit comprising:
   a light source;
   a luminescent wheel comprising a plurality of segments that receive light emitted from the light source to emit different wavelength ranges of light;
   a color wheel separate from the luminescent wheel and onto which the different wavelength ranges of light from the luminescent wheel are shone, the color wheel comprising (i) a first transmission area that transmits light, in visible light, that exists in a certain range of wavelengths, and (ii) a second transmission area that transmits light that exists in a range of wavelengths that is broader than the range of wavelengths of the light that is transmissible through the first transmission area; and
   a control module configured to control the luminescent wheel and the color wheel so that the luminescent wheel and the color wheel are synchronized with each other, and to control the light source so that the light emitted from the light source is sequentially shone onto the plurality of light source segments,
   wherein the light source segments of the luminescent wheel comprise a first light source segment, a second light source segment, and a third light source segment that emit light in a first range of wavelengths, light in a second range of wavelengths, and light in a third range of wavelengths, respectively, wherein the light in the second range of wavelengths includes a wavelength range of the light in the first range of wavelengths and a wavelength range of the light in the third range of wavelengths, and wherein the control module has (i) a first projection mode in which the light in the second range of wavelengths that is emitted from the second light source segment is caused to be incident on the second transmission area and (ii) a second projection mode in which the light in the second range of wavelengths that is emitted from the second light source segment is caused to be incident on the first transmission area.

2. The light source unit according to claim 1, wherein the light source segments of the luminescent wheel emit:
  (i) light in a range of red wavelengths,
  (ii) light in a range of green wavelengths,
  (iii) light in a range of blue wavelengths, and
  (iv) light in a range of cyan wavelengths or light in a range of magenta wavelengths or light in a range of yellow wavelengths.

3. The light source unit according to claim 1, wherein the light source segments of the luminescent wheel further comprise a fourth light source segment that emits light in a fourth range of wavelengths.

4. The light source unit according to claim 3, wherein the first transmission area transmits the light in the first range of wavelengths and the light in the fourth range of wavelengths and interrupts transmission of the light in the third range of wavelengths,
  wherein in the first projection mode, the light in the first range of wavelengths and the light in the fourth range of wavelengths are caused to be incident on the first transmission area and the light in the second range of wavelengths and the light in the third range of wavelengths are caused to be incident on the second transmission area, and
  wherein in the second projection mode, the light in the first range of wavelengths and the light in the second range of wavelengths are caused to be incident on the first transmission area and the light in the third range of wavelengths and the light in the fourth range of wavelengths are caused to be incident on the second transmission area.

5. The light source unit according to claim 3, wherein the first transmission area transmits the light in the third range of wavelengths and the light in the fourth range of wavelengths and interrupts transmission of the light in the first range of wavelengths,
  wherein in the first projection mode, the light in the first range of wavelengths and the light in the second range of wavelengths are caused to be incident on the second transmission area and the light in the third range of wavelengths and the light in the fourth range of wavelengths are caused to be incident on the first transmission area, and
  wherein in the second projection mode, the light in the first range of wavelengths and the light in the fourth range of wavelengths are caused to be incident on the second transmission area and the light in the second range of wavelengths and the light in the third range of wavelengths are caused to be incident on the first transmission area.

6. The light source unit according to claim 3, wherein the light in the first range of wavelengths, the light in the second range of wavelengths, the light in the third range of wavelengths, and the light in the fourth range of wavelengths are light in a range of green wavelengths, light in a range of yellow wavelengths, light in a range of red wavelengths, and light in a range of blue wavelengths, respectively.

7. The light source unit according to claim 3, wherein the first light source segment, the second light source segment and the third light source segment are a luminous light emitting area that receives light emitted from the light source as excitation light to emit luminous light, and
  wherein the fourth light source segment is a diffuse transmission area that transmits light emitted from the light source to emit the light as the light in the fourth range of wavelengths.

8. The light source unit according to claim 3, wherein in the second projection mode, in some of the light in the first range of wavelengths, the light in the second range of wavelengths, and the light in the third range of wavelengths, the lights that are caused to be incident on the first transmission area are controlled individually or collectively as regarding that there exists one output period in relation to emitting time.

9. The light source unit according to claim 3, wherein in the second projection mode, in some of the light in the first range of wavelengths, the light in the second range of wavelengths, and the light in the third range of wavelengths, the lights that are caused to be incident on the first transmission area are kept emitted in a color mixing period when a wavelength range of the incident light is switched over.

10. A projector comprising:
  the light source unit according to claim 1;
  a display device configured to generate image light;
  a projection-side optical system configured to project image light emitted from the display device onto a screen; and
  a projector control unit configured to control the light source unit and the display device.

* * * * *